United States Patent

Pommerening et al.

[15] 3,697,695

[45] Oct. 10, 1972

[54] CALL METERING FOR TELEPHONE EXCHANGE

[72] Inventors: Uwe A. Pommerening, 251 Raphael Drive; Stanley L. Russell, 649 Beverly Drive, both of Webster, N.Y. 14580

[22] Filed: Dec. 9, 1970

[21] Appl. No.: 96,388

[52] U.S. Cl. ....................179/7 MM

[51] Int. Cl. ....................H04m 15/38, H04m 15/10

[58] Field of Search....179/7 R, 7 MM, 7.1 R, 7.1 TP

[56] References Cited

UNITED STATES PATENTS

| | | | |
|---|---|---|---|
| 3,342,940 | 9/1967 | Gattner | 179/7.1 R |
| 3,591,723 | 7/1971 | Dal Monte | 179/7 MM |
| 3,160,709 | 12/1964 | Burke | 179/7 MM |
| 3,342,939 | 9/1967 | Gattner | 179/7.1 R |

*Primary Examiner*—Kathleen H. Claffy
*Assistant Examiner*—Thomas D'Amico
*Attorney*—Hoffman Stone and Charles C. Krawczyk

[57] ABSTRACT

A call metering system for a telephone exchange having a computer type memory in which each line to be metered is assigned a separate address. A scanner scans the lines at high speed, and stops when it reaches a marked line. The address to be charged is fed to one input of a comparator, and when this is done, another high speed scanner scans the memory. It stops when the comparator produces an identity signal indicating that the memory scanner is at the address assigned to the line to be charged. The number stored at that address in the memory is then fed to an adder, increased by one and re-inserted at the same address. The memory may be queried from a manually operated control station or automatically by a computer or printer.

4 Claims, 4 Drawing Figures

INVENTORS
UWE A. POMMERENING
STANLEY L. RUSSELL

BY

ATTORNEY

INVENTORS
UWE A. POMMERENING
STANLEY L. RUSSELL
BY
ATTORNEY

INVENTORS
UWE A. POMMERENING
STANLEY L. RUSSELL
BY
ATTORNEY

CALL METERING FOR TELEPHONE EXCHANGE

BRIEF DESCRIPTION

This invention relates to a novel circuit arrangement for metering telephone calls placed through a telephone exchange to enable the exchange to charge individual lines according to the numbers of calls made by them respectively, and also to analyze the traffic passing through the exchange.

The system of the invention was originally designed for use in a private branch exchange such as in a hotel to provide an up-to-the-second count of the number of telephone calls placed from each extension and thereby enable the desk clerk to charge each departing guest for his use of the telephone. One major object was to provide a system that did not require the use of a separate peg-meter for each extension, and which presented the necessary information more quickly and conveniently than it could be read from an array of peg-meters.

It was found also that the system was readily adaptable for use with computerized, or other automated billing systems, and also for traffic analysis in large central offices, with the achievement of substantial economies relative to systems heretofore proposed.

Briefly, the system of the invention comprises a memory of the kind used in a computer in which a separate address is assigned to each line to be metered. The calls are monitored by a high speed scanner, which may be arranged to scan either the trunks or the lines depending on where the message charge marks appear. The scanner stops when it finds a marked trunk or line, and a unit count is added to the number at the address in the memory assigned to the calling line. The scanner then resumes scanning, seeking the next mark.

The memory may be queried from a panel controlled, for example, by the hotel desk clerk, or by automatic billing or printing equipment.

By providing enough addresses and making the bit capacity at each address in the memory large enough, the system is easily adapted for traffic analysis in large central offices. In fact, memory devices are currently available so inexpensively that it is thought to be economically advantageous from a manufacturing point of view to standardize on a bit capacity per address for all uses, even though in many utilizations only a small part of the storage available at each address will be required.

DETAILED DESCRIPTION

A presently preferred embodiment of the invention will now be described in connection with the accompanying drawings, wherein.

Figure 1:
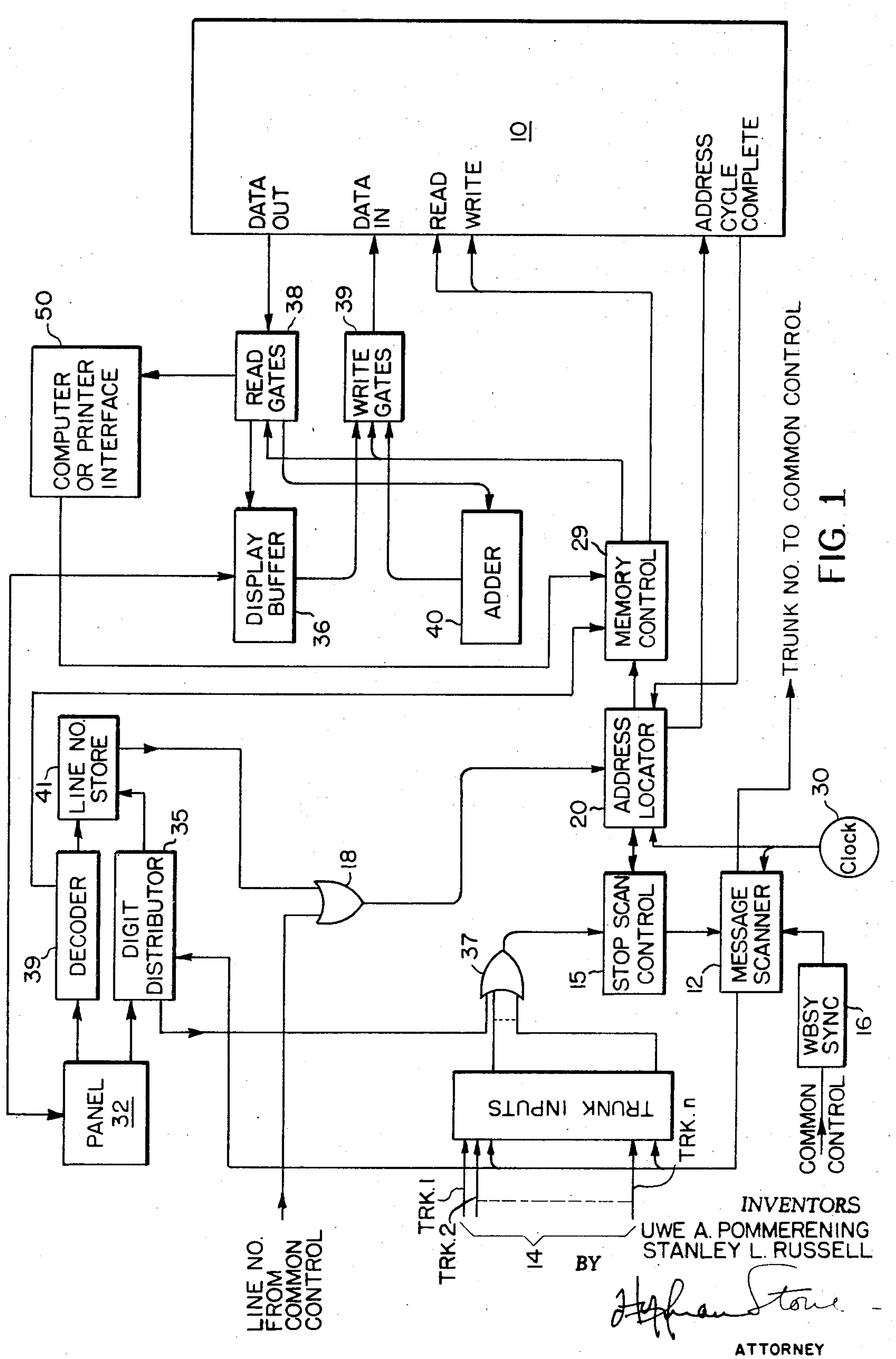
FIG. 1 is a schematic block diagram of a call metering system according to the invention.

Referring first to FIG. 1, the heart of the system is a memory 10 of any of the kinds used in computers, and capable of storing information in binary form. Typically, it is of the kind consisting of a matrix of magnetic cores. It may have a capacity, for example, of 4,096 words of 16 bits each, which would be a convenient size for many utilizations. It could serve as a modular unit so that the overall capacity could be increased simply by adding more memories of the same size.

As shown in FIG. 1, the system is arranged for operation in an exchange of the common control type where the identity of the calling line is stored in the common control (not shown) at the initiation of a call, and the outgoing trunk is marked when the connection is first completed. A scanner 12 is connected to scan the trunks 14 at a rapid rate, typically 1 megahertz, stopping in response to a signal from the stop scan control 15 when it encounters a marked trunk. It then applies a signal through an interrogation synchronizer 16 to the common control asking the common control to forward the line identity signal as soon as it can be made available.

Figure 2:
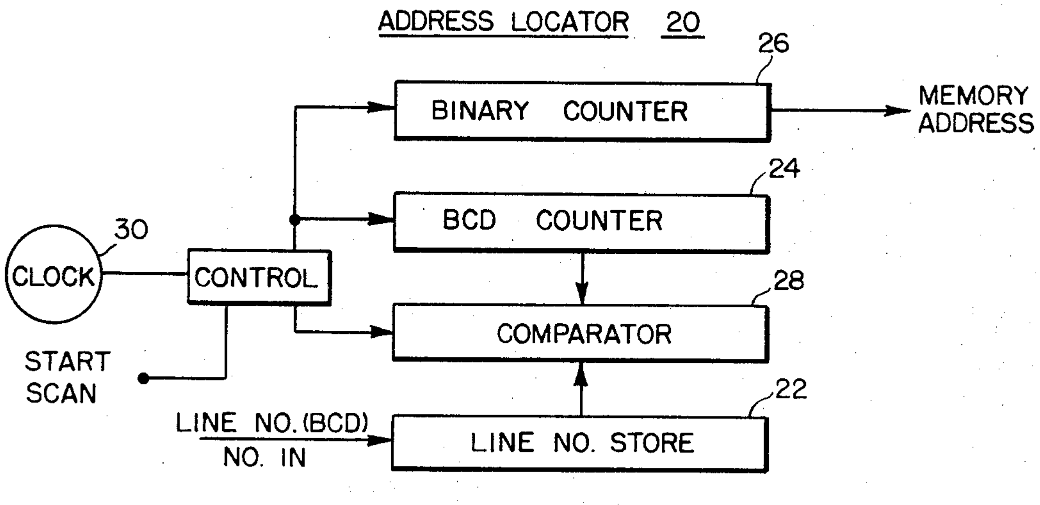
FIG. 2 is a schematic block diagram of the address locator portion of the system illustrated in FIG. 1.

The line identity signal from the common control is fed through a LINE NUMBER OR gate 18 to the address locator 20, the block diagram of which is shown in FIG. 2. The line identity signal is ordinarily in the form of a binary coded decimal number. It is received and stored in a binary coded decimal store 22 in the address locator.

In addition to the BCD store 22, the address locator 20 includes a binary coded decimal counter 24 and a straight binary counter 26. The straight binary counter 26 is connected to scan the memory 10, stepping to successive addresses in the memory each time it is stepped. The two counters 24 and 26 are driven synchronously starting with a START-SCAN signal, which is generated in response to reception of the line identity signal in the store 22.

The content of the store 22 is applied to one input of a comparator 28, and the instantaneous condition of the BCD counter 24 is applied to the other input of the comparator. When the comparator 28 indicates that the condition of the counter 24 matches the line number in the store 22, it generates a STOP-SCAN signal, and a unit is added to the number at the address in the memory 10 where the binary counter 26 has come to rest.

The addition is accomplished under the control of a memory control circuit 29, which operates the read gates 38 and the write gates 39, first to extract the number from the memory address, feed it to the adder 40, which adds the unit, and then to return the sum to the memory.

To avoid possible overlap, the trunk, or line scanner 12 is preferably not started until after the entry of the call into the memory 10. Once this is completed, the address locator 20 is reset, and the scanner 12 restarted. In accordance with recognized practice, the timing of the system is under control of a single clock 30, which may be the same clock that times the common control if it is of the digital type.

Figure 3:
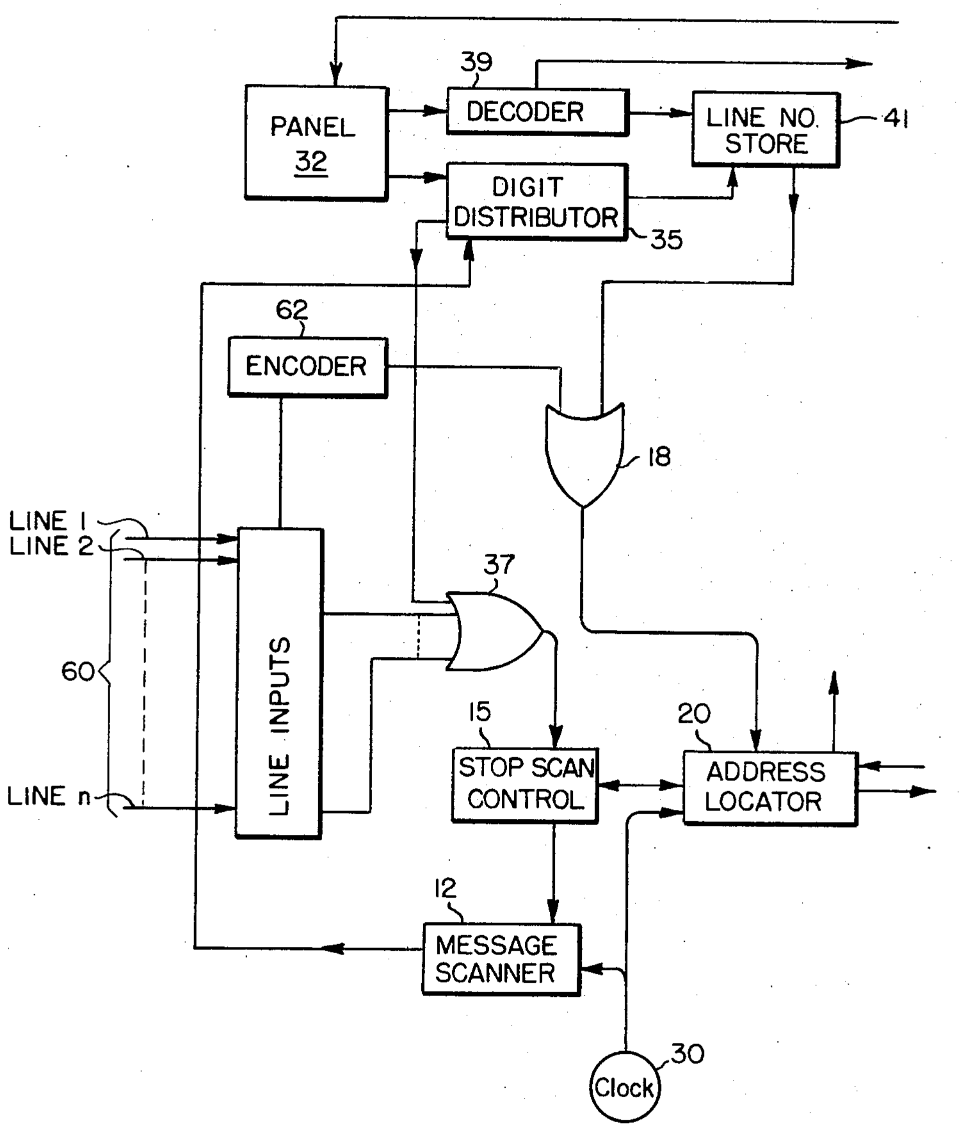
FIG. 3 is a schematic block diagram showing the system of FIG. 1 arranged for scanning subscriber lines instead of the trunk connections.

Visual read-out of the memory 10 is provided at a control panel 32 illustrated in FIG. 3. The operator keys in the line identity number by actuating the keys of the keyboard 34, or by dialing. His call is fed through a digit distributor 35 and the trunk OR gate 37 to the stop scan control 15, and causes the scanner 12 to stop scanning as if the operator's call had appeared as a mark on one of the trunks 14. The number keyed by the operator is also fed through a decoder 39 to a line number store 41, and thence through the OR gate 18 to the address locator 20. The address locator 20 then operates to find the address in the memory of the line number keyed by the operator.

Keying in of the number at the panel 32 also readies a display buffer 36, which operates to prevent the readout operation from being counted as an additional message. The display buffer works into the read gates 38 and the write gates 29 to block the adder 40 from the memory 10 until the desired data is secured from the memory 10. The count signal from the designated address in the memory 10 is fed to the display buffer 36, where it is held as long as desired and used to actuate a count annunciator 42 at the panel. The line number is also stored in the display buffer 36 and displayed on a line number annunciator 44 to provide a visual check that the count corresponds to the desired line number.

When the panel operator thereafter wants to clear the annunciators 42 and 44 he presses either the RESET button 46 or the ON-OFF button 48. When he does so, the panel circuit makes another appearance through the trunk OR gate 37 to trigger the stop scan control 15, and the line number address in the memory is again found by the address locator 20. If the RESET button was actuated, a binary zero is inserted into the memory at the located address, and if the START-STOP button was actuated, the metering count from the display buffer 36 is re-inserted.

As indicated by the block 50, the memory may be queried by a computer or an automatic printer, or by any other system to provide automatic read-out, with or without automatic reset, as desired, thus providing for automatic billing and for traffic recording and analysis.

Figure 4:
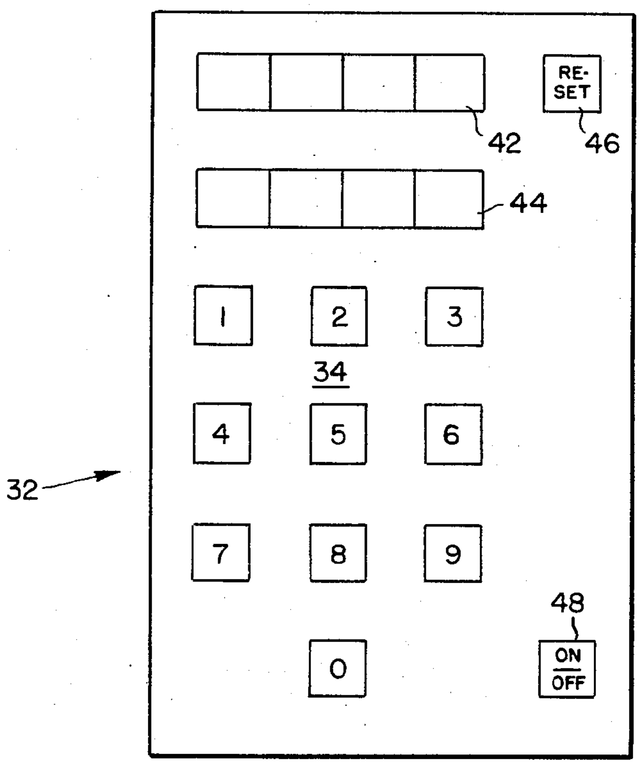
FIG. 4 is a plan view of a read-out panel for querying the memory.

As shown in FIG. 4, the system may readily be connected for use with a step-by-step switching system, or other systems where the line number identification is available only from the calling lines and not from the trunk circuits, by having the scanner 12 scan the individual lines 60 instead of the trunks. Step-by-step systems do not usually include line number identifying storage means associated with the trunk circuits, and line number identification must be obtained from the appearances of the respective lines on the frame. The individual lines 60 are connected to a translator, or encoder 62 from which the line numbers are taken instead of from the common control. The scanner 12 in this instance scans the calling lines 60, and the line number identification is obtained through the encoder 62, and the rest of the operation is the same as described hereinabove in connection with the embodiment of FIG. 1.

What is claimed is:

1. An automatic call metering system for a telephone exchange comprising:

a. a memory device of the kind having addressable storage units for digital data, b. a scanner for scanning terminals in the exchange where marks appear indicating message units, c. means for stopping said scanner when it reaches a marked terminal, d. means operative when said scanner stops for producing a signal indicative of the calling line number that is connected to the marked terminal where said scanner is stopped, e. an address locator responsive to the signal produced by said producing means for addressing said memory and finding therein an address in accordance with the identity of the calling line number, said locator finding a different address for each respective line number, f. an adder arranged to add a predetermined number to a data signal applied to it, g. memory control means responsive to operation of said address locator for applying the digital data stored at the found address to said adder and returning the sum produced by said adder to the found address, h. a manual readout panel including annunciator means and line number identification input means for presenting a visible indication of the data stored at any selected one of the addressable storage units of said memory, i. means responsive to said input means of said panel for applying a line number identification signal to said address locator, and for inhibiting said adder, j. a display buffer for driving said annunciator means, k. the system being arranged so that data at the address found by said address locator in response to said input means is applied to and stored in said display buffer and thereby applied to said annunciator means, and l. means responsive to operation of said panel for alternatively re-inserting data from said display buffer into the address from which it was taken, and inserting a signal indicating zero at the address and destroying the data taken from the address.

2. A system according to claim 1 wherein said scanner is connected to scan terminals in the trunk circuits of the exchange.

3. A system according to claim 1 wherein said manual readout panel includes a line number display device for providing a visible indication of the number put in by said line number identification input means.

4. In an automatic call metering system for a telephone exchange, the system being of the kind including:

a. a memory device having addressable storage units for digital data, b. a scanner for scanning terminals in the exchange where marks appear indicating message units, c. means for stopping said scanner when it reaches a marked terminal, d. means operative when said scanner stops for producing a signal indicative of the calling line number that is connected to the marked terminal where said scanner is stopped, e. an address locator responsive to the signal produced by said producing means for addressing said memory and finding therein an address in accordance with the identity of the calling line number, said locator finding a different address for each respective line number, f. an adder arranged to add a predetermined number to a data signal applied to it, and g. memory control means responsive to operation of said address locator for applying the digital data stored at the found address to said adder and returning the sum produced by said adder to the found address, the improvement comprising:

h. a manual readout panel including annunciator means and line number identification input means for presenting a visible indication of the data stored at any selected one of the addressable storage units of said memory, i. means responsive to said input means of said panel for applying a line number identification signal to said address locator, and for inhibiting said adder, j. a display buffer for driving said annunciator means, k. the system being arranged so that data at the address found by said address locator in response to said input means is applied to and stored in said display buffer and thereby applied to said annunciator means, and l. means responsive to operation of said panel for alternatively re-inserting data from said display buffer into the address from which it was taken, and inserting a signal indicating zero at the address and destroying the data taken from the address.

* * * * *